US005630030A

United States Patent [19]
Kawamura

[11] Patent Number: 5,630,030
[45] Date of Patent: May 13, 1997

[54] OUTPUT METHOD AND APPARATUS FOR A RECORDING DEVICE

[75] Inventor: Yoshiaki Kawamura, Narashino, Japan

[73] Assignee: Canon Kabushiki Kaisha, Tokyo, Japan

[21] Appl. No.: 323,607

[22] Filed: Oct. 17, 1994

Related U.S. Application Data

[63] Continuation of Ser. No. 53,348, Apr. 28, 1993, abandoned, which is a continuation of Ser. No. 683,836, Apr. 11, 1991, abandoned.

[30] Foreign Application Priority Data

Apr. 20, 1990 [JP] Japan .................................. 2-103198

[51] Int. Cl.⁶ .................................................. G06K 15/00
[52] U.S. Cl. ........................................... 395/115; 395/113
[58] Field of Search ...................... 395/115, 116, 395/113, 112, 101, 114, 150, 145, 117, 164; 358/404, 444, 403; 400/61, 76

[56] References Cited

U.S. PATENT DOCUMENTS

| | | | |
|---|---|---|---|
| 4,679,153 | 7/1987 | Robinson et al. | 395/117 |
| 4,947,345 | 8/1990 | Paradise et al. | 395/114 |
| 4,992,958 | 2/1991 | Kageyama et al. | 395/116 |
| 5,044,790 | 9/1991 | Kawamura | 395/116 |
| 5,058,037 | 10/1991 | Kageyama et al. | 395/114 |
| 5,075,874 | 12/1991 | Steeves et al. | 395/112 |
| 5,327,526 | 7/1994 | Nomura et al. | 395/114 |

*Primary Examiner*—Arthur G. Evans
*Attorney, Agent, or Firm*—Fitzpatrick, Cella, Harper & Scinto

[57] ABSTRACT

In an output method and apparatus for a printing device, a plurality of buffers are provided. The method and apparatus can determine data having the highest priority, and preferentially output the determined priority data.

17 Claims, 3 Drawing Sheets

[cs] 5s ABC ------ XYZ [cs] e

1

OUTPUT METHOD AND APPARATUS FOR A RECORDING DEVICE

This application is a continuation of application Ser. No. 08/053,348 filed Apr. 28, 1993, now abandoned, which is a continuation of application Ser. No. 07/683,836 filed Apr. 11, 1991, abandoned.

BACKGROUND OF THE INVENTION

1. Field of the Invention

This invention relates to an output method and apparatus for a recording device, and more particularly, to an output method and apparatus which preferentially outputs a set of data having higher priority among plural sets of received output data.

2. Description of the Related Art

In a conventional output apparatus, such as a printer, printing data transmitted from a host computer or the like, serving as an external apparatus, having been input, are first stored in a memory, and printing is then sequentially performed in the order of data reception.

Accordingly, even if printing data to be preferentially printed are input, the preferential printing data can be printed only after all the printing data that has been received and stored before the preferential printing data was received and stored have been printed.

SUMMARY OF THE INVENTION

The present invention has been made in consideration of the above-described problem.

It is arm object of the present invention to provide an output method and apparatus which comprises storage means capable of storing a plurality of sets of information to be output, and which can preferentially output sets of information having higher priority among the plurality of sets of information.

It is another object of the present invention to provide an output apparatus for inputting data to be output from an external apparatus and for recording the data on a recording medium, comprising storage means having a plurality of memories for receiving and storing sets of data to be output together with priority information, and output means for selectively outputting sets of data having the highest priority among all the sets of data to be output stored in the plurality of memories.

As described above in detail, sets of printing data are received from an external apparatus together with priority information, and stored in a plurality of memories. The apparatus operates so as to selectively print the sets of printing data having the highest priority among all the sets of printing data stored in the plurality of memories.

DETAILED DESCRIPTION OF THE PREFERRED EMBODIMENTS

Preferred embodiments of the present invention will now be explained in detail with reference to the attached drawings. The present invention may be configured in a single apparatus or in a plurality of apparatuses. Furthermore, the invention may be achieved in an apparatus or in a system with a program.

Figure 1:
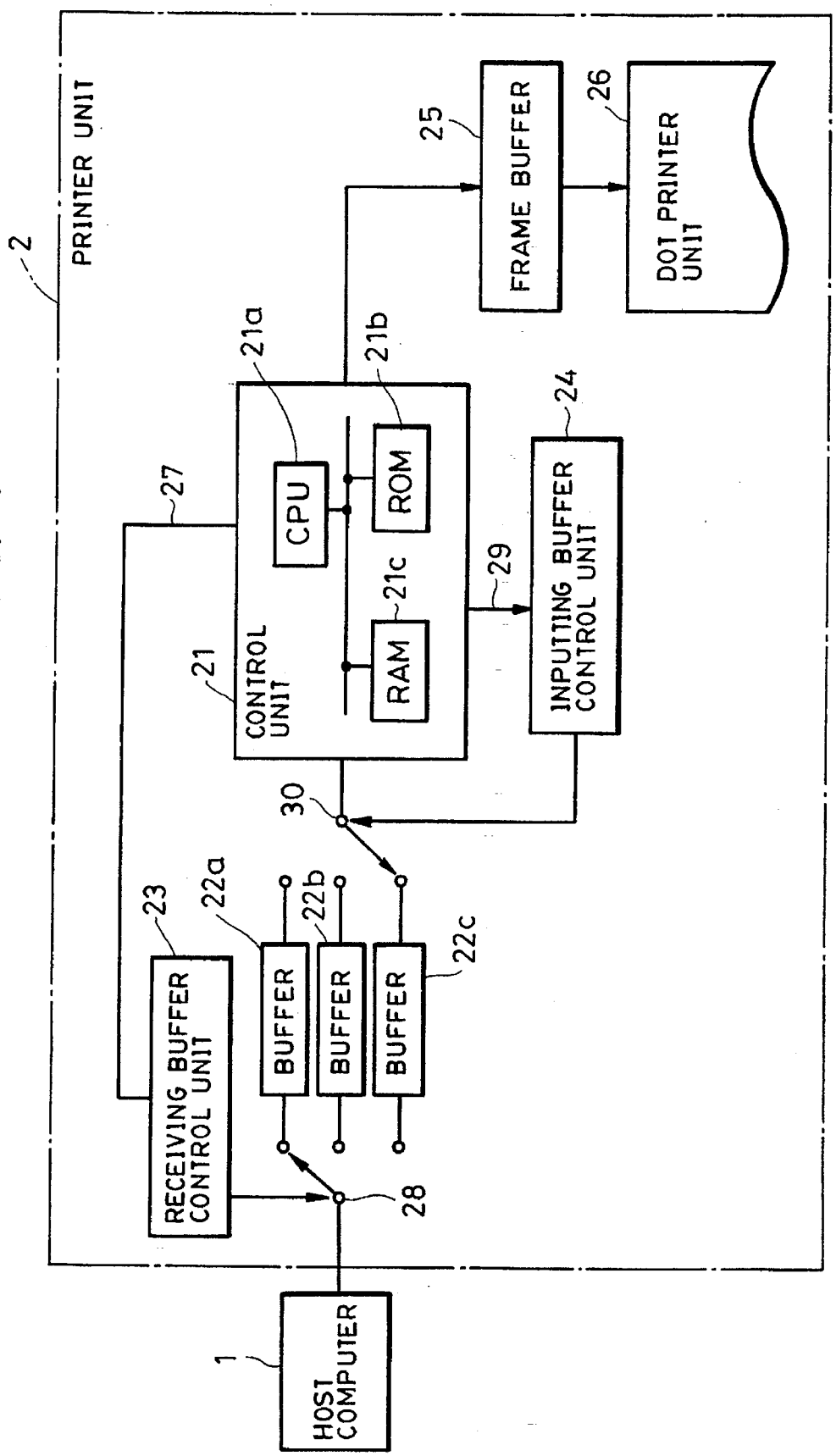
FIG. 1 is a block diagram showing the schematic configuration of a printer according to an embodiment of the present invention.

Explanation of Printer (FIG. 1)

FIG. 1 is a block diagram showing the schematic configuration of a printer according to an embodiment of the present invention.

In FIG. 1, a host computer 1 transmits printing data, control commands or the like to a printer unit 2 of the embodiment. Reference number 2 indicates the entire printer unit of the embodiment. In the printer unit 2, a control unit 21 controls the entire apparatus, and includes, for example, a CPU (central processing unit) 21a, such as a microcomputer or the like, a ROM (read-only memory) 21b for storing control programs for the CPU 21a and various kinds of data, a RAN 21c used as work areas for the CPU 21a, and the like.

Buffers 22a, 22b and 22c temporarily store printing data transmitted from the host computer 1. A receiving buffer control unit 23 searches for a vacant buffer (any one of the buffers 22a, 22b and 22c) when a printing job has been completed by the control of the control unit 21, determines a buffer in which subsequently received printing data are to be stored, and switches a switch 28 in accordance with the result of determination. The buffers discussed above have an object different from that of a W buffer method for increasing printing speed. An inputting buffer control unit 24 checks the states of the buffers 22a, 22b and 22c then a job has been completed (when data in any one of the buffers 22a–22c performing printing disappear) by the control of the control unit 21, selects the buffer storing printing data having the highest priority, and switches a switch 30 so as to connect the selected buffer to the control unit 21.

A frame buffer 25 expands and stores dot pattern data for one page by the control of the CPU 21a. A dot printer unit 26 comprises a dot printer or the like. Signal line 27 is used when the control unit 21 requests the receiving buffer control unit 23 to switch the receiving buffer when a job has been completed. The switch 28 selects a buffer for receiving and storing data from the host computer 1 by the control of the receiving buffer control unit 23. Signal line 29 is used when the control unit 21 requests the inputting buffer control unit 24 to switch among the input buffers 22a, 22b and 22c when a job has been completed. The switch 30 selects and switches to an input buffer for inputting printing data to the control unit 21 from among the input buffers 22a, 22b and 22c by the control of the inputting buffer control unit 24.

Figures 2, 3:
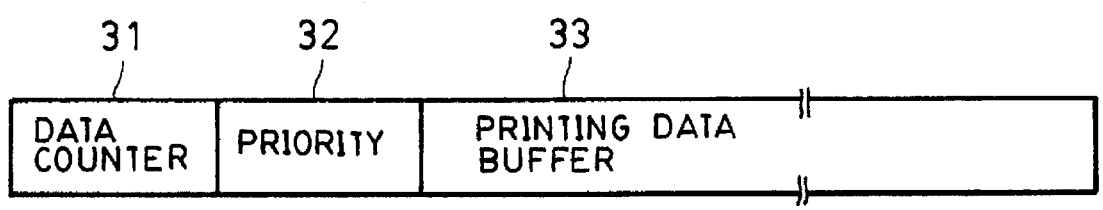
FIG. 2 shows an example of data transmitted from a host computer to the printer of the embodiment.
FIG. 3 shows an example of the configuration of data in a buffer of the printer of the embodiment.

FIG. 2 shows an example of printing data transmitted from the host computer 1 to the printer 2 of the embodiment.

In FIG. 2, [CS] indicates a control code CSI (9BH, where H represents a hexadecimal number). [CS]5S indicates a job having a priority "5". [CS]e is a code indicating the end of a job.

FIG. 3 shows the configuration of data in the buffers 22a, 22b and 22c.

In FIG. 3, reference numbers 31, 32 and 33 represent areas for storing the number indicative of the quantity of printing data (data counter), the priority information of the job, and the printing data, respectively.

If the data shown in FIG. 2 have, for example, been received, numeral "26" (representing 26 alphabet characters) is stored in the data counter area 31 as the number of printing data, numeral "5" is stored in the priority information area 32, and character data of alphabet to be actually printed, fox example ABC–XYZ or the like, are stored in the printing data buffer area 33.

Figure 4:
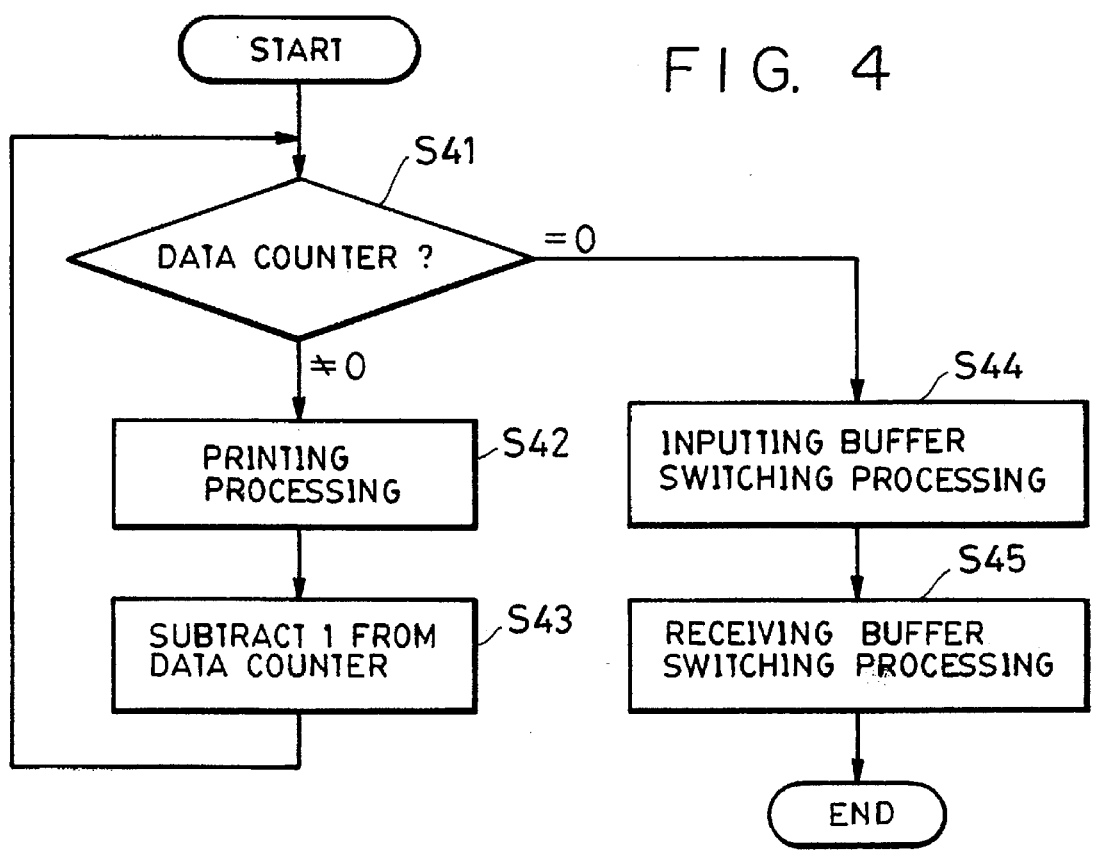
FIG. 4 is a flowchart showing a printing operation in the printer of the embodiment.

FIG. 4 is a flow-chart showing the control process of the control unit 21 of the embodiment. The control program of the CPU 21a for executing this process is stored in the ROM 21b. When the program is started, it is assumed that the state of the connection of the buffers 22a–22c is as shown in FIG. 1, that is, the switches 28 and 30 are connected to the buffers 22a and 22c, respectively.

Thus, data transmitted from the host computer 1 are sequentially stored in the buffer 22a, and the control unit 21 performs printing processing sequentially reading data stored in the buffer 22c. At step S41, it is checked whether or not the value of the data counter 31 (representing the number of printing data) is "0". If the result of the check is negative, the process proceeds to step S42, where printing processing is performed. The process then proceeds to step S43, where the value of the data counter 31 is subtracted by one, and the process returns to step S41. That is, when printing processing for one item of printing data has been completed, the value of the data counter 31 is subtracted by one, and the process returns to step S41.

If the result of the check at step S41 is affirmative, the process proceeds to step S44, where the control unit 21 requests the inputting buffer control unit 24 to switch the buffer via the signal line 29. The inputting buffer control unit 24 thereby checks priority for printing data stored in the buffers 22a and 22b via the switch 30, and switches the switch 30 so that the buffer storing printing data having higher priority is connected to the control unit 21.

Subsequently, the process proceeds to step S45, where the control unit 21 requests the receiving buffer control unit 23 to switch the buffer for storing the received data via the signal line 27. The receiving buffer control unit 23 thereby latches the request, and checks the buffers 22b and 22c via the switch 28 in order to store the next printing data in the assigned buffer when the job of printing data currently being input has been completed, and switches the switch 28 so as to store received data in a vacant buffer. If a vacant buffer is not present, a busy signal is output to the host computer 1 to interrupt data transmission from the host computer 1.

As explained above, by repeatedly executing steps S41 through S45, a job having higher priority is preferentially subjected to printing processing.

Although, in the present embodiment, an explanation has been provided of received data in a printer, the present invention cart also be effectively applied to the control of data in a communication network.

As explained above, the present embodiment has the effect that printing data having higher priority can be preferentially printed by providing a plurality of buffers, storing a plurality of sets of printing data by switching among the buffers, and reading and printing data having higher priority in accordance with the priority order to be processed.

As explained above, according to the present invention, an apparatus comprises storage means capable of storing data including a plurality of sets of printing information and corresponding priority information, and can preferentially print printing information having higher priority among the plurality of sets of printing information. Received data in the present embodiment may, of course, be transmitted either through a wired system or a wireless system.

Figure 5:
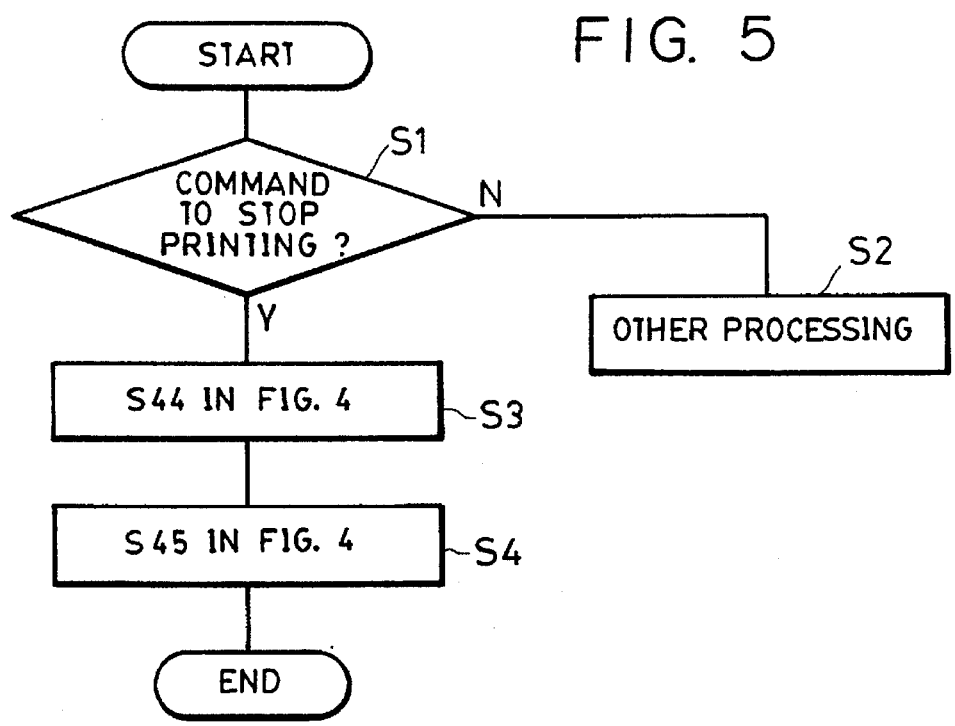
FIG. 5 is a flowchart showing a printing operation in another embodiment of the present invention.

FIG. 5 shows another embodiment of the present invention relating to priority printing processing when a command to stop printing is present;

The command to stop printing is input from a switch (not shown) on a panel provided in the printer unit 2. In FIG. 5, at step S1, it is determined whether or not a request for a command to stop printing is present. If the result of the determination is negative, the process proceeds to other processing. If the result of the determination is affirmative, the process proceeds to steps S3 and S4, where the same processing as in steps S44 and S45 shown in FIG. 4 is performed, for the following reason: If a command to stop printing has been received, for example, while performing printing according to the priority data stored in the buffer 22c as shown in FIG. 1, printing must be started according to the priority data stored in any one of the buffers 22a, 22b and 22c irrespective of the presence of the data stored in the buffer 22c.

The present invention is of course not limited to printing, but may also be applied to a display device, such as a CRT or the like.

What is claimed is:

1. An output apparatus comprising:

input means for receiving data from an external apparatus, the data including information to be output and priority information designated by the external apparatus;

storage means having a plurality of memories for receiving the data from said input means, and for storing the received data;

selection means for selecting a memory storing the data having the priority information among all of the data stored in said plurality of memories; and output means for outputting information to be output from the memory selected by said selection means.

2. An apparatus according to claim 1, wherein the data is divided into a plurality of sets, each data set including information to be output and priority information.

3. An apparatus according to claim 1, further comprising means for determining a vacant memory of said plurality of memories to receive a set of data from said input means.

4. An apparatus according to claim 1, wherein the information to be output includes character information.

5. An apparatus according to claim 1, wherein the information to be output is output to a printer engine.

6. A printing method comprising the steps of:

inputting data from an external apparatus, the data including a plurality of sets of information to be output and corresponding priority information designated by the external apparatus; and selecting sets of information to be output from among the plurality of the received sets of information to be output according to the corresponding priority information designated by the external apparatus.

7. A method according to claim 6, further comprising the steps of outputting the selected sets of information to be output and printing the outputted sets of information.

8. A method according to claim 6, wherein the inputted data is stored in memories prior to said selecting step.

9. An output apparatus comprising:

input means for receiving data from an external apparatus;

storage means for receiving from said input means a plurality of sets of data, each set of data including information to be output and corresponding priority information designated by the external apparatus, and for storing the received sets of data;

command means for commanding stopping of an output of one of the plurality of sets of information to be output from said storage means; and selection means for selecting one of the rest of said plurality of sets of information to be output after a command from said command means.

10. An apparatus according to claim 9, wherein said storage means includes a plurality of buffers.

11. An apparatus according to claim 9, wherein the information to be output includes character information.

12. An apparatus according to claim 9, wherein the selected set of information to be output is output to a printer engine.

13. An output method comprising the steps of:

receiving a plurality of sets of data from an external apparatus, each set of data including a set of information to be output and corresponding priority information designated by the external apparatus;

receiving a command for stopping an output; and selecting one of the plurality of sets of information to be output after the command receiving step.

14. A method according to claim 13, further comprising the steps of outputting the selected set of information to be output and printing the outputted set of information.

15. A method according to claim 13, wherein the inputted data is stored in memories prior to said selecting step.

16. An output apparatus comprising:

input means for receiving data from an external apparatus, the data including information to be output and priority information designated by the external apparatus;

storage means having a plurality of memories for receiving the data from said input means, and for storing the received data;

selection means for selecting a first memory storing the data having the priority information among all of the data stored in said plurality of memories;

judging means for judging whether instruction information instructing stoppage of information output from the first memory selected by said selection means is input or not; and output control means for selecting a second memory which is next highest in priority to the first memory selected by said selection means if the instruction information is judged to be input by said judging means and outputting information of the selected second memory.

17. An output method comprising the steps of:

inputting data from an external apparatus, the data including a plurality of sets of information to be output and corresponding priority information designated by the external apparatus;

storing the data input from the external apparatus in a plurality of memories;

selecting a first memory for storing the data based on the priority information designated by the external apparatus;

judging whether instruction information instructing stoppage of information output from the first memory is input or not; and selecting a second memory which is next highest in priority to the first memory if it is determined that the instruction information is input and outputting information of the selected second memory.

* * * * *

UNITED STATES PATENT AND TRADEMARK OFFICE
CERTIFICATE OF CORRECTION

PATENT NO. : 5,630,030
DATED : May 13, 1997
INVENTOR(S) : Kawamura

It is certified that error appears in the above-identified patent and that said Letters Patent is hereby corrected as shown below:

COLUMN 1:

Line 32, "arm" should read --an--.

COLUMN 2:

Line 33, "then" should read --when--.

COLUMN 3:

Line 4, "fox" should read --for--;
    Line 48, "cart" should read --can--; and
    Line 67, "present;" should read --present.--.

COLUMN 4:

Line 24, "memories" should read --memory areas--;
    Line 25, "data" should read --data directly--;
    Line 26, "data;" should read --data with the information to be output being stored independently of the priority information;--;
    Line 27, "memory" should read --memory area--;
    Line 28, "priority" should read --highest priority--;
    Line 29, "memories;" should read --memory areas;--;
    Line 31, "memory" should read --memory area--;
    Line 44, "apparatus," should read --apparatus directly to a storage device having a plurality of memory areas,--;

UNITED STATES PATENT AND TRADEMARK OFFICE
CERTIFICATE OF CORRECTION

PATENT NO. : 5,630,030                    Page 2 of 4
DATED      : May 13, 1997
INVENTOR(S): Kawamura et al.

It is certified that error appears in the above-identified patent and that said Letters Patent is hereby corrected as shown below:

Line 47, "apparatus;" should read --apparatus, the plurality of sets of information to be output being stored independently of the priority information;--;

Line 51, "apparatus." should read --apparatus by selecting a one of the plurality of memory areas storing the set of information to be output having the highest priority among all of the data stored in the plurality of memory areas.--;

Line 59, "storage means for receiving" should read --storage means having a plurality of memory areas for receiving directly--; and Line 63, "data;" should read --data by storing the information to be output independently of the priority information;--.

COLUMN 5:

Line 3, "means." should read --means by selecting the information to be output having the highest priority information among the rest of the plurality of sets of information stored.--;

Line 11, "data" should read --data directly--;

UNITED STATES PATENT AND TRADEMARK OFFICE
CERTIFICATE OF CORRECTION

PATENT NO. : 5,630,030  Page 3 of 4
DATED : May 13, 1997
INVENTOR(S) : Kawamura

It is certified that error appears in the above-identified patent and that said Letters Patent is hereby corrected as shown below:

```
Line 15, "apparatus;" should read
  --apparatus;
     storing the plurality of data sets in a
  storage device having a plurality of
  memory areas by storing the information
  to be output independently of the
  priority information;--;
Line 18, "step." should read --step by
  selecting the information to be output
  having the highest priority information
  among the rest of the plurality of sets of
  information stored.--;
Line 29, "memories" should read --memory areas--;
Line 30, "data" should read --data directly--;
Line 31, "data;" should read --data with the
  information to be output being stored
  independently of the priority information;--;
Line 32, "memory" should read --memory area--;
Line 33, "the priority" should read --the
  highest priority--; and
Line 34, "memories;" should read --memory areas;--.
```

COLUMN 6:

```
Line 3, "memory" should read --memory area--;
Line 4, "input or not;" should read --input;--;
Line 5, "memory" should read --memory area--;
```

UNITED STATES PATENT AND TRADEMARK OFFICE
CERTIFICATE OF CORRECTION

PATENT NO. : 5,630,030
DATED : May 13, 1997
INVENTOR(S) : Kawamura

It is certified that error appears in the above-identified patent and that said Letters Patent is hereby corrected as shown below:

```
Line 6, "memory" should read --memory area--;
Line 11, "memory." should read --memory area.--;
Line 19, "data" should read --data directly--;
Line 20, "memories;" should read --memory
   areas, by storing the information to be
   output independently of the priority
   information;--;
Line 21, "memory" should read --memory area--, and
   "on the" should read --on the highest--;
Line 23, "ratus;" should read --ratus among
   all of the data stored;--;
Line 26, "memory" should read --memory area--;
Line 27, "input or not;" should read --input;--;
Line 29, "memory" should read --memory area--;
Line 30, "memory" should read --memory area--, and
   "determined" should read --determined in said
   judging step--; and
Line 32, "memory." should read --memory area.--.
```

Signed and Sealed this

Twenty-fourth Day of February, 1998

BRUCE LEHMAN

*Attest:*

*Attesting Officer*  *Commissioner of Patents and Trademarks*